United States Patent
Budnitz (10) Patent No.: US 10,691,785 B1
(45) Date of Patent: Jun. 23, 2020

(54) AUTHENTICATION OF A USER DEVICE COMPRISING SPATIAL TRIGGER CHALLENGES

(71) Applicant: Paul Budnitz, Burlington, VT (US)

(72) Inventor: Paul Budnitz, Burlington, VT (US)

( * ) Notice: Subject to any disclaimer, the term of this patent is extended or adjusted under 35 U.S.C. 154(b) by 0 days.

(21) Appl. No.: 16/400,510

(22) Filed: May 1, 2019

Related U.S. Application Data (63) Continuation of application No. 16/392,336, filed on Apr. 23, 2019, now abandoned.

(51) Int. Cl.
| | |
|---|---|
| *G06F 21/36* | (2013.01) |
| *G06Q 20/40* | (2012.01) |
| *H04W 4/029* | (2018.01) |
| *G06T 19/00* | (2011.01) |
| *H04W 12/00* | (2009.01) |
| *H04L 29/06* | (2006.01) |
| *H04L 9/32* | (2006.01) |

(52) U.S. Cl.
CPC ......... *G06F 21/36* (2013.01); *G06Q 20/4014* (2013.01); *G06T 19/006* (2013.01); *H04L 9/3273* (2013.01); *H04L 63/08* (2013.01); *H04W 4/029* (2018.02); *H04W 12/00508* (2019.01)

(58) Field of Classification Search
CPC ............ H04W 4/029; H04W 12/00508; G06T 19/006
See application file for complete search history.

(56) References Cited

U.S. PATENT DOCUMENTS

| | | | | |
|---|---|---|---|---|
| 9,092,600 | B2* | 7/2015 | Scavezze | G06F 21/31 |
| 10,157,504 | B1* | 12/2018 | Jain | H04L 63/102 |
| 2013/0019293 | A1* | 1/2013 | Puppin | G06Q 30/0601 726/7 |
| 2015/0007289 | A1* | 1/2015 | Godse | G06F 21/31 726/7 |
| 2016/0267770 | A1* | 9/2016 | Keays | G08B 25/08 |
| 2018/0040161 | A1* | 2/2018 | Tierney | G06T 19/006 |
| 2018/0068103 | A1* | 3/2018 | Pitkanen | H04L 63/0861 |
| 2018/0310171 | A1* | 10/2018 | Whitaker | H04W 12/06 |
| 2018/0373858 | A1* | 12/2018 | Farkash | G06F 21/36 |
| 2018/0373859 | A1* | 12/2018 | Ganong | G06F 21/32 |

OTHER PUBLICATIONS

U.S. Appl. No. 16/392,336, filed Apr. 23, 2019, Budnitz.
"AR Demo walking into another world." Uploaded to Twitter by gsmetzer, Mar. 21, 2018, retrieved from https://twitter.com/gsmetzer/status/976543111798185984, 1 page.

(Continued)

*Primary Examiner* — Madhuri R Herzog
(74) *Attorney, Agent, or Firm* — Sheridan Ross P.C.

(57) ABSTRACT

Authentication of a user device, and/or associated user, to a system is a key component of many systems whereby access is restricted to only authorized personnel. Spatial challenges require a user, as determined by at least a sensor of a user device, to perform a particular spatial action. A sensor in the user device provides output signals and, if the output signals are associated with compliance with the spatial challenge, authorization to access a secured asset may then be granted.

18 Claims, 7 Drawing Sheets

(56) References Cited

OTHER PUBLICATIONS

Halls, "You can now drink augmented reality cocktails at City Social bar in London," GQ Magazine, Jul. 13, 2017, retrieved form https://www.gq-magazine.co.uk/article/augmented-reality-cocktails, 6 pages.

Harris, "Snapchat augmented reality turns empty store into virtual Lego shop," Independent, Feb. 12, 2019, retrieved from https://www.independent.ie/world-news/and-finally/snapchat-augmented-reality-turns-empty-store-into-virtual-lego-shop-37811561.html, 7 pages.

Robertson, "New LEGO Augmented Reality App Is The Best Open-World LEGO Video Game," Forbes, Dec. 1, 2017, retrieved from https://www.forbes.com/sites/andyrobertson/2017/12/01/new-lego-augmented-reality-a pp-is-the-best-open-world-lego-video-game/#45b84e5e498a, 6 pages.

\* cited by examiner

AUTHENTICATION OF A USER DEVICE COMPRISING SPATIAL TRIGGER CHALLENGES

CROSS-CITATION TO RELATED APPLICATIONS

The present application incorporates by reference U.S. application Ser. No. 16/392,336 filed Apr. 23, 2019 entitled "AUTHENTICATION OF A USER DEVICE COMPRISING SPATIAL TRIGGER CHALLENGES", the entire disclosure of which is hereby incorporated by reference.

FIELD OF THE DISCLOSURE

The present disclosure is generally directed toward authentication of a user to a system and more specifically, authentication of a user device associated with a user to a system.

BACKGROUND

Providing data, such as passwords and personal identification numbers (PINs) or a biometric identifier (e.g., voice, facial, fingerprint, retinal, etc.) are well understood means of authenticating a user to a device, such as a computer, security panel, etc. As computing devices, such as laptop computers, tablets, and cellular telephones, have both gained portability and computing power, often a user is authenticated to the device, such as a by providing a passcode, password, or body component for biometric recognition. Once the user-to-user device authentication is performed, the user device may then be authenticated to other components, such as to enable access to secured information (e.g., medical records, business documents, etc.), perform a transaction (e.g., banking, e-commerce, etc.), or launch an application (e.g., email, financial application, etc.).

SUMMARY

It is with respect to the above issues and other problems that the embodiments presented herein were contemplated.

User authentication is a key component in many systems. In addition to the methods, and enabling hardware, of the prior art systems, spatial triggers are provided by the embodiments disclosed herein. A user is first authenticated to a user device. The user device comprises portable computing device, such as a cellular telephone, tablet, laptop, electronic goggles or glasses, or other computing device which may further comprise wireless connectivity hardware and instructions (e.g., WiFi, Bluetooth, Near Field Communications, cellular, etc.). The user device may be embodied as one device (e.g., cellular telephone, laptop, tablet, etc.) or a plurality of devices (e.g., wearable and paired cellular telephone). For example, a user may wear a "smart watch," which provides a portion of the functionality of the user device and is in communication with a cellular telephone carried by the same user, which provides another portion of the functionality of the user device. The user device may comprise one or more sensing components (e.g., accelerometer, altimeter, orientation, compass, microphone, camera, vision, location (GPS coordinates), etc.).

In one embodiment, a user having a user device may be asked to perform one or more tasks as a component of an authentication challenge. While the authentication challenge may incorporate known non-spatial challenges (e.g., enter a user name and password), as described herein, the authentication challenge comprises at least one spatial challenge. A spatial challenge may be a task or action, such as capturing an image at a particular location, capturing a sound at a particular location, placing their user device in a particular physical location or orientation, setting a location using device GPS tracking, and/or transition their user device through a particular physical location or orientation. It should be appreciated that a human user may receive, such as via their user device, the instruction to perform the action and may be required to perform an action, however, compliance or lack of compliance is determined with respect to the user device, such as one or more sensor outputs indicating the user device has performed the action and then, upon determining the output signals from the one or more sensors indicates compliance with the instruction. Once the user device successfully indicates compliance with the spatial challenge, indicating the user performed the action, the user and/or the user device may be granted access to a secured asset such as private information, enabled to perform a secured transaction, or granted access to a secured location. In another embodiment, the access to the secured asset and/or enabling the secure transaction may be transitory and/or geospatially limited.

In one embodiment, a user device is disclosed, comprising: a data storage; and a processor that: selects, from the data storage, an authentication challenge comprising a first spatial challenge; causes the first spatial challenge to be presented by the user device; receives a first sensor output indicating a first spatial action of the user device; determines whether the authentication challenge is successful, further comprising determining the first sensor output indicates compliance with the first spatial challenge; and upon the determination that the authentication challenge is successful, grants the user device access to a secured asset.

In another embodiment, a server is disclosed comprising: a data storage; a network interface to a network; and a processor that: establishes a communication with a first user device, utilizing the network interface, wherein the communication comprises a request for authentication; accesses, from the data storage, an authentication challenge comprising a first spatial challenge; sends the first spatial challenge to the first user device for presentation by the first user device; receives a first sensor output indicating a first spatial action of the first user device; determines whether the authentication challenge is successful, further comprising determining the first sensor output indicates compliance with the first spatial challenge; and upon the determination that the authentication challenge is successful, grants the first user device access to a secured asset.

In another embodiment, a method for authentication is disclosed, comprising: selecting an authentication challenge comprising a first spatial challenge; causes the first spatial challenge to be presented by a user device; receiving a first sensor output indicating a first spatial action of the user device; determining whether the authentication challenge is successful, further comprising determining the first sensor output indicates compliance with the first spatial challenge; and upon the determination that the authentication challenge is successful, granting the user device access to a secured asset.

The phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known to as "the cloud," but may include a public, private, dedicated, shared and/or other service bureau, computing service, and/or "server farm."

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
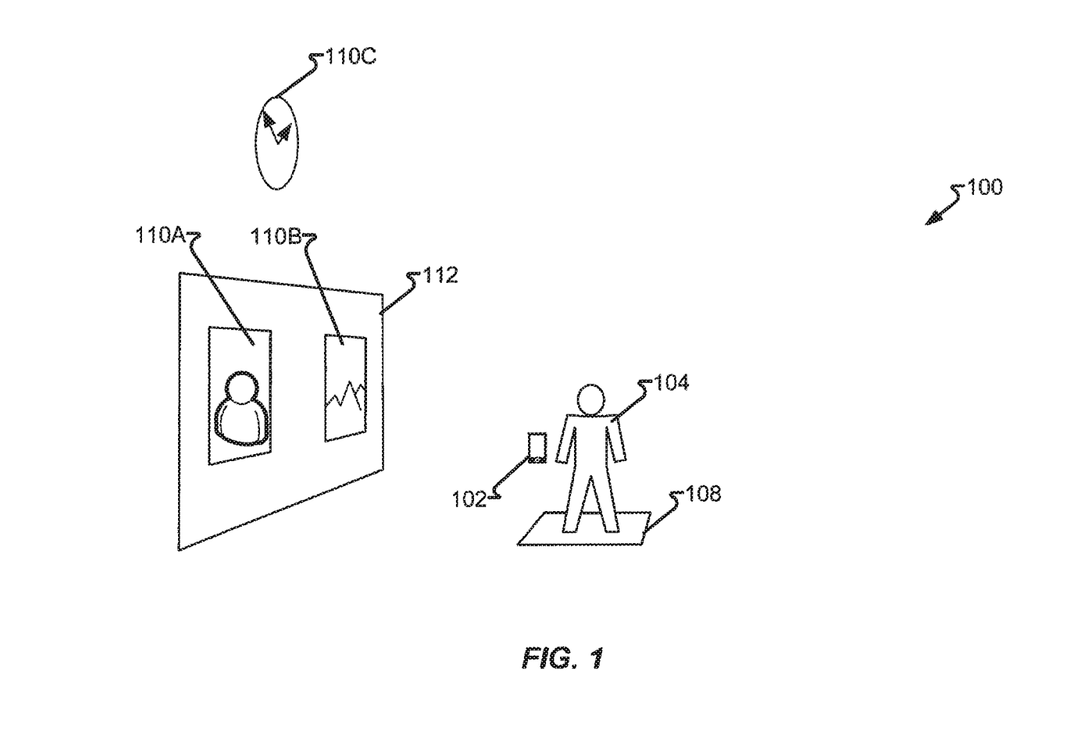
FIG. 1 depicts a first environment in accordance with embodiments of the present disclosure.

FIG. 1 depicts environment 100 in accordance with embodiments of the present disclosure. In one embodiment, environment 100 comprises artifacts 110, such as wall 112 with portrait 110A and landscape 110B, and clock 110C. Artifacts 110 may comprise a visual artifact, such that user 104 may capture an image with a camera of user device 102. In another embodiment, artifact 110 may comprise an acoustic source, such as chimes or ticking of clock 110C, which may then be captured by a microphone of user device 102. User 104 may wish to utilize user device 102 to access a secured asset. Upon being authenticated, user device 102 and/or user 104 is authorized to access the secured asset. As a component of an authorization challenge, user device 104 is presented with a spatial challenge that confirms user device 102 is at location 108, which may further require the user to be at location 108 at a particular time or within a window of time.

User 104 may be provided with an authentication challenge, such as by receiving a message on user device 102 or by other means. The authentication challenge, if successfully completed, will grant user 104 and/or user device 102 access to a secured asset. In one example, the authentication challenge requires user 104 to stand in location 108 and capture an image of artifact 110A. The presence of user 104 within location 108 may be determined by a relative angle in which the camera of user device 102 captures the image of artifact 110A was captured or other known geo-location means (e.g., radio triangulation, GPS coordinates, etc.) available to device 102 and/or a system in communication with device 102 (e.g., WiFi network, cellular network, etc.). In another embodiment, the presence of user 108 may be determined, with at least an acceptable degree of certainty, by making the spatial challenge known to user 104 minimally in advance of a deadline to complete the spatial challenge. For example, location 108 may be a relatively small area within a much larger area, such as a few square feet in an office building or a particular room in a gallery. If user 104 is correctly located in area 108 and receives a portion of spatial challenge, such as by receiving and observing a message on user device 102, user 104 may be able to comply with the instruction to capture an image, such as of artifact 110B, within a few seconds. Accordingly, if user 104 completes the spatial challenge within, for example, fifteen seconds, then user 104 may be determined to be within location 108. Artifacts may be static (e.g., artifact 110A, 110B) or dynamic, such as the positions of a hand of a clock (e.g., artifact 110C), image of trees as they change over seasons, tides, traffic, etc.

Artifacts 110 may comprise acoustic artifacts, which may be static over an interval of time (e.g., ticking of a clock) or may be dynamic or at least unique over another period of time, such as capturing the sound of the clock striking twelve, or the announcements at a train station comprising the arrival or departure of a particular train, etc. In certain embodiments, successfully completing a single spatial challenge may be sufficient to authorize user 104 and/or user device 102 to access the secured asset. An acoustic artifact may operate independently of user 104 and/or user device 102 or be triggered by user 104 and/or user device 102. In another embodiment, two or more spatial challenges may be arranged in a series to provide additional assurances that user 104 is known, known to be at a particular location, authorized, etc. A subsequent spatial challenge may be provided to user 104 after determining, with an acceptable threshold of confidence, that a particular user is user 104. A spatial challenge may require user 104 to be at a particular location, such as location 108 or another area reachable by user 104, within a particular time window. In another embodiment, artifact 110 may be radio frequency (e.g., within range of a particular WiFi transmitter, Near Field Communication (NFC) transmitter, being determined to be at a location having a particular GPS coordinate, etc.).

The secured asset, to which user 104 and/or user device 102 may be granted access upon completion of an authentication challenge, is variously embodied. In one embodiment, the secured asset is an electronic record (e.g., document, image, media file, encryption/decryption key, data record, transaction, etc.) previously installed in the memory of user device 102, such as an encrypted file. Upon successfully completing the authentication challenge, the secured asset is decrypted or decryption enabled, such that user 104 and/or user device 102 may access the secured asset in an unencrypted form. In another embodiment, the secured asset may be an electronic record that resides on another device in communication, or enabled to communicate, with user device 102. Upon successfully completing the authentication challenge, the secured asset is provided (e.g., made accessible, authorized, downloaded, streamed, etc.) to user device 102. In another embodiment, the secured asset may be a particular location. Upon successfully completing the authentication challenge, user 104 is allowed to access the particular location. In a further embodiment, the particular location may be time specific or time limited. Additionally or alternatively, when the secured asset is a particular location, access may be further limited to a particular number of users 104, even if such users 104 had successfully completed the authentication challenge.

User device 102 may be variously embodied. User device 102 comprises at least one sensor (e.g., visual, audio, haptic, compass, orientation, altitude, acceleration, radio frequency, etc.) and a processor (i.e., an electronic microprocessor comprising input, output, and processing circuitry and further comprising, or having access to, memory providing retrievable storage of data and/or instructions to be executed by the processor). User device 102 may further comprise human input/output components (e.g., display screen, speaker, microphone, touch screen, buttons, switches, haptic input/output, etc.) and/or communications components (e.g., WiFi, Bluetooth, NFC, cellular, infrared, etc.) to enable device 102 to communicate with other networks and devices. User device 102 may be embodied as a single device (e.g., a smart phone) or a plurality of devices. such as a first user device portion (e.g., a smart watch, smart glasses, virtual reality headset, or other portable/wearable device) in communication with a second user device portion (e.g., smart phone, tablet computer, laptop computer, etc.), which may further comprise restricting certain communications to be exclusively between the first user device and the second user device portion (i.e., paired).

Figure 2:
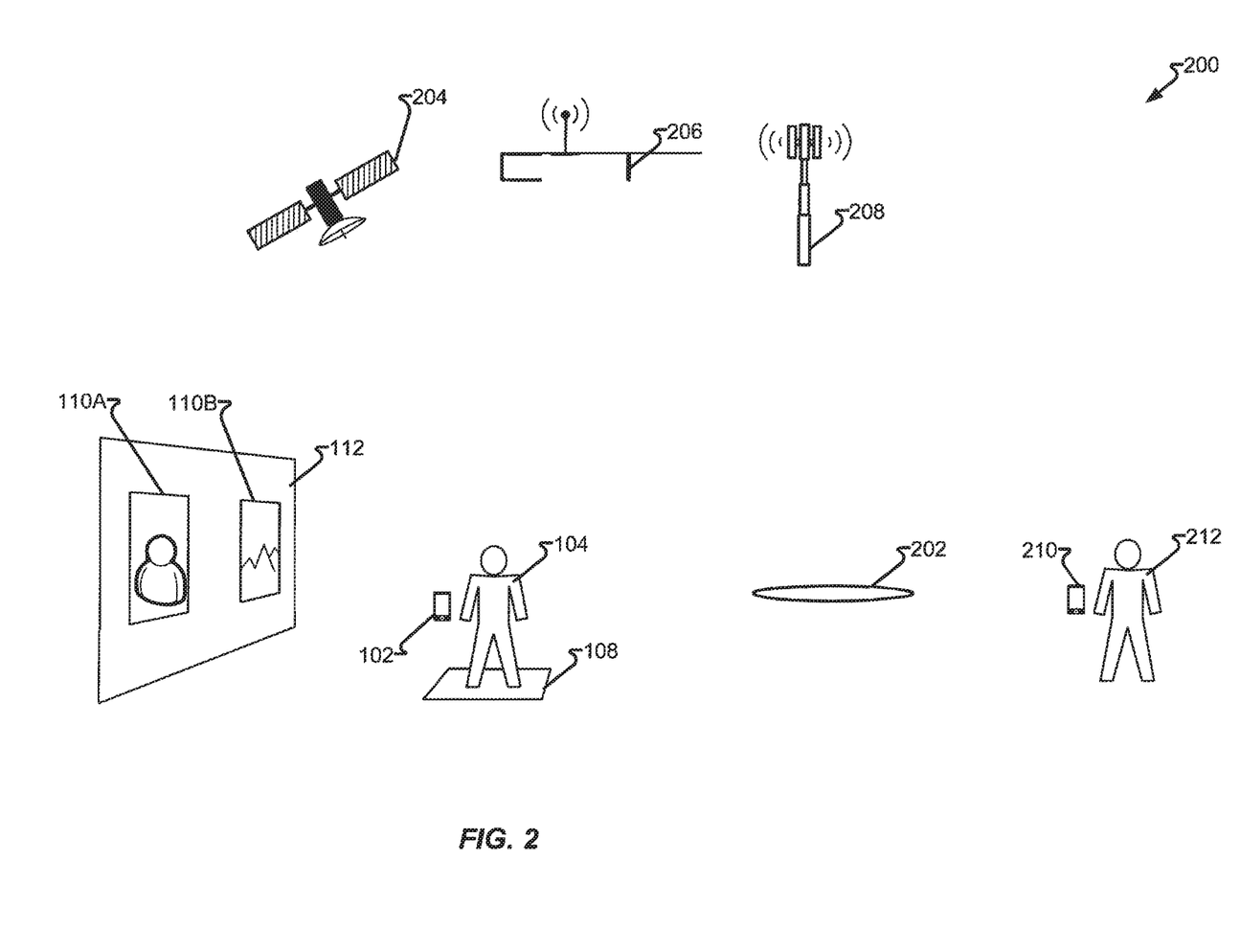
FIG. 2 depicts a second environment in accordance with embodiments of the present disclosure.

FIG. 2 depicts environment 200 in accordance with embodiments of the present disclosure. User device 102 may receive and/or transmit radio frequency signals to other components such as satellite 204, such as to receive GPS signals, satellite based communications, etc.; network communication interface 206, such as WiFi, WiMax, Bluetooth, NFC, etc.; cellular tower 208, such as to communicate via a cellular voice and/or data network; other user device 210 associated with another user 212; and/or other components.

In one embodiment, user 104 via user device 102 successfully completed a first spatial challenge, such as a sensor (e.g., camera) capturing an image of artifact 110A, which has been verified to comply with the first spatial challenge. Compliance with the first spatial challenge may be determined by an absolute compliance or compliance within a particular category of deviations and/or an acceptable amount of deviation. For example, capturing an image may not produce an exact replica of an ideal captured image due to differences in camera equipment, compression loss, lighting, position variations from within location 108, etc.

Differences may be permitted, and compliance still found, when the difference is one of a permitted category type, such as brightness or contrast of a captured image, additional sounds captured with an acoustic artifact, etc. and/or the difference is one of permitted degree (e.g., the brightness of a captured image is 4% lighter compared to an ideal image, the captured image is rotated seven degrees, etc.). The difference criteria may then be utilized such that a signal from a sensor, selected in accord with the type of sensing operation (e.g., camera for images/video, microphone for sound, etc.) is determined to differ by an acceptable amount, such as an acceptable difference from an ideal or at least know acceptable signal that would indicate an ideal compliance with the spatial challenge. Alternatively or additionally, components of the sensor signal may indicate compliance when then entirety of the sensor signal may not. Permitted differences may be determined via a combination of difference types and/or degrees. For example, one permitted difference allows for a captured image to be rotated twelve degrees, when the brightness is within 3% of an ideal image, however, the captured image can only be rotated by six degrees, if the brightness difference is greater than 3% but less than 15% and still be considered a permitted difference.

In another embodiment, successfully completing a first spatial challenge initiates a second spatial challenge, such as relocating to area 202, capturing a subsequent artifact, etc. Area 202 may be defined by GPS signals from satellite 204, radio triangulation such as from signals from one or more of network interface 206, cellular tower 208, and/or other user device 210.

Figure 3:
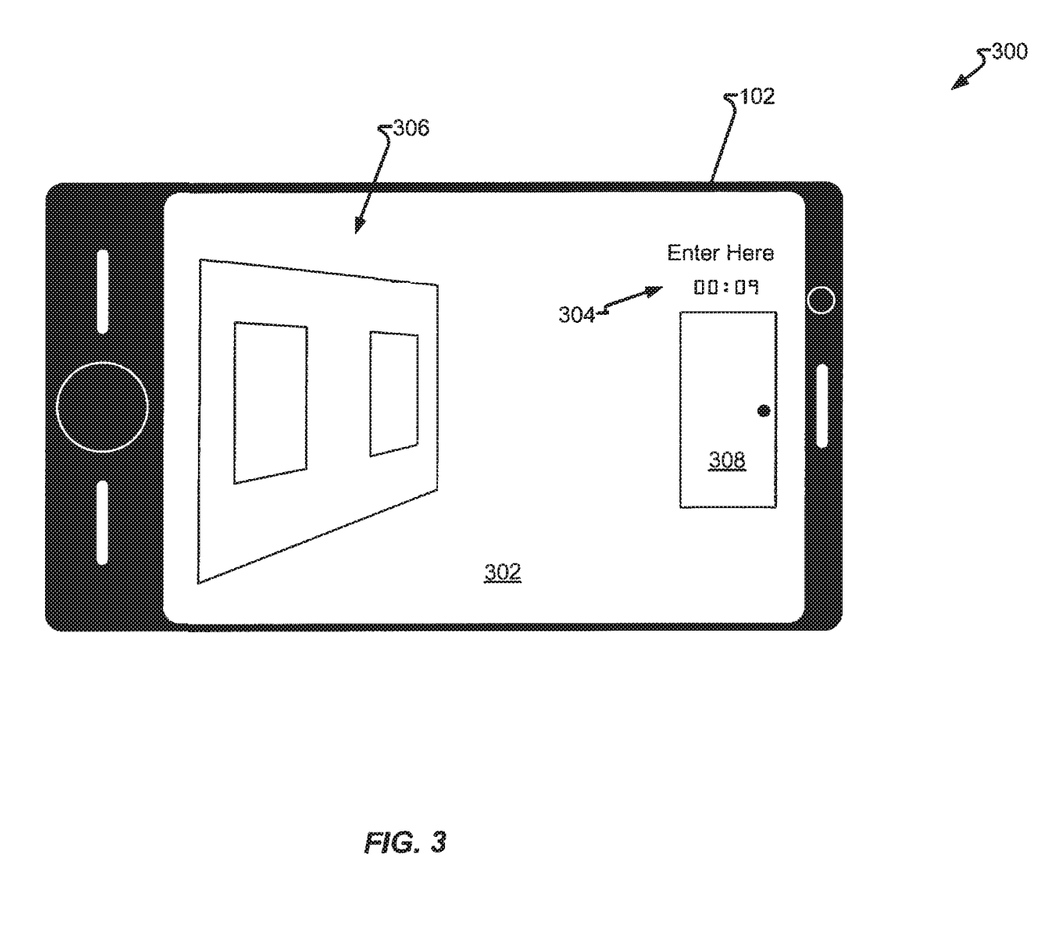
FIG. 3 depicts a challenge in accordance with embodiments of the present disclosure.

FIG. 3 depicts challenge 300 in accordance with embodiments of the present disclosure. In one embodiment, user device 102 has display 302 operable to present an image for observation by a user, such as user 104. In one embodiment, display 302 presents a hybrid image comprising camera captured portion 306 and augmented reality portion 308.

In one embodiment, augmented reality portion 308 is presented in display 302 to coincide with a target location of a spatial challenge, such as location 108 and/or area 202 and provides a visual cue as to where location 108 and/or area 202 is located in physical space. Therefore, passing user device 102 through a virtual door, as presented by augmented reality portion 308, causes user device 102 to pass into area 202. Accordingly, a spatial challenge requiring user device 102 to enter area 202 may be successfully performed when, as presented on display 302, user 104 with user device 102 passes through the virtual reality door. Additionally or alternatively, the "door" may comprise a "front" and/or "back" portion of the door, such that entering area 202 from an angle not indicating the "front" of the door may be considered a failure to comply with the spatial challenge comprising utilizing the "front" of the door. The "door" may be of any size or shape, and may or may not be of human scale. The "door" may appear the same size, larger or smaller than the area indicated by area 202.

In another embodiment, augmented reality portion 308 may comprise additional or alternative visual, auditory, and/or haptic cues. For example, augmented reality portion 308 may indicate a spatial challenge that requires user device 102 to "tap" an augmented reality object. A sensor within user device 102 may output a signal in compliance with the spatial challenge when user 104 flicks user device 102 in a direction and/or location indicated by augmented reality portion 308. In another example, an icon such as a speaker may be provided as at least a component of augmented reality portion 308 to indicate that a sound should be captured by a sensor (e.g., microphone) of user device 102 at the location coinciding with the location of the speaker provided by display 302.

In another embodiment, annotation 304 may be provided as a portion of augmented reality portion 308, such as to provide additional information (e.g., time remaining in before the spatial challenge is revoked, number of individuals who may complete the spatial challenge, status of secured asset or assets, etc.

Upon completion of the spatial challenge indicated by augmented reality portion 308, user 104 and/or user device 102 may be granted access to the secured information or, alternatively, presented with a subsequent authentication challenge, such as a subsequent spatial challenge and/or non-spatial challenge (e.g., provide a user name, etc.). In one embodiment, a subsequent spatial challenge may comprise a further limitation upon a current spatial challenge, such as by entering area 108 but only from the "front" of a door, such that a direction of travel coincides with the front of the door as displayed by augmented reality portion 308. In another embodiment, a particular orientation may be required, such that user 104 or at least user device 102 must be in a particular orientation (e.g., facing one direction and walking backwards to enter area 108). In another embodiment, a subsequent action may require the actions of another user 212 utilizing another user device 210. For example, user 212 may be presented with a different augmented reality portion, such as indicating a switch, trigger, or other action required in which "unlocks" or enables access to the "door" provided by augmented reality portion 308. Successfully completing such a spatial challenge by two parties may enable one or both of user 104 and 212 to access the secured asset.

Figure 4:
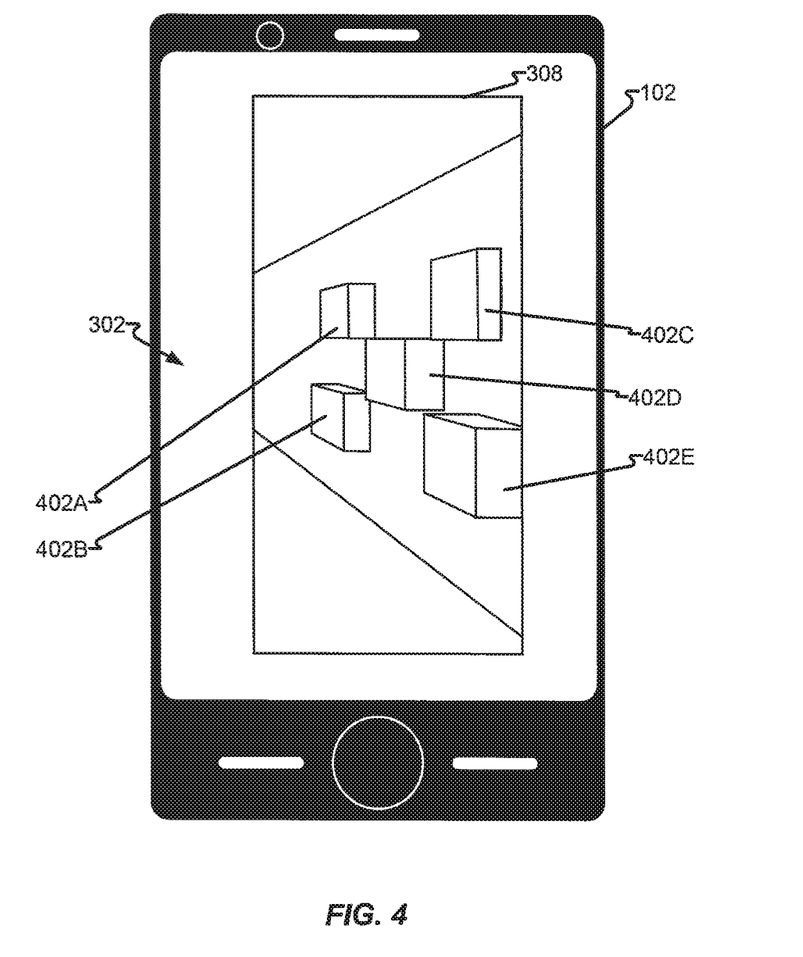
FIG. 4 depicts secured assets in accordance with embodiments of the present disclosure.

FIG. 4 depicts secured assets 402 comprising a secured asset in accordance with embodiments of the present disclosure. In one embodiment, depicted secured assets 402 depict a corresponding electronic asset, which may be represented by rendered visual objects presented as at least a portion of augmented reality portion 308 on display 302. For example, upon completion of a spatial challenge or authentication challenge comprising at least one spatial challenge, user 104 via user device 102 is presented with indicia of secured asset or secured assets 402 as one or more rendered objects. One or more render objects may be provided as text, symbol, image, geometric shape, object, etc. associated with a one or more secured assets 402. One or more rendered objects may present depicted secured assets 402 themselves, such as text that displays the secured asset (e.g., "Access code to the second floor is '1234'") or require further interaction to obtain the secured asset represented by depicted secured assets 402. For example, one of depicted secured assets 402 may represent a media file and require user 104, via user device 102 and/or other device, to load, play, download, or otherwise obtain the media file. Similarly, an icon or label for a document may be provided by, for example one of depicted secured assets 402, which may then be available for presentation on user device 102 and/or other device associated with user 104. In another embodiment, one of depicted secured assets 402 may be an object such as the subject of a transaction which may then be enabled such that user device 102 and/or other device associated with user 104, is able to perform the transaction, such as a purchase, or obtain a reward or discount code, which may require accessing or obtaining additional information, such as payment information. In another embodiment, one of depicted secured assets 402 may indicate authorization to a secured location, whereby a code may be provided to obtain access to a controlling device (e.g., keypad door lock), indicia of the location itself, and/or other location information.

Figure 5:
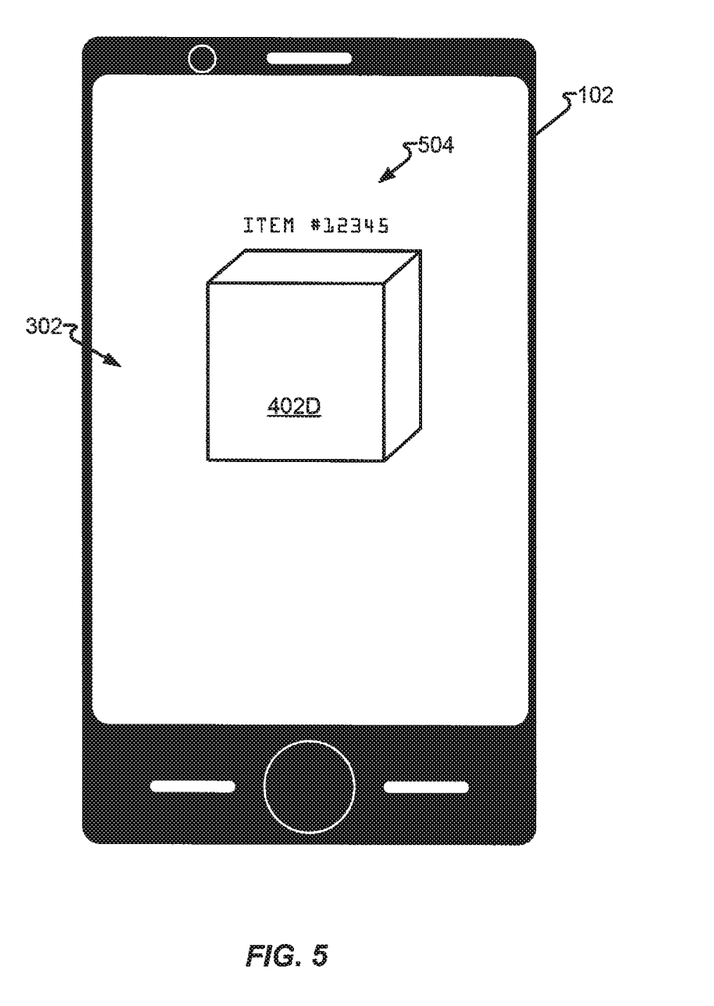
FIG. 5 depicts one secured asset in accordance with embodiments of the present disclosure.

FIG. 5 illustrates depicted secured asset 402D in accordance with embodiments of the present disclosure. In one embodiment, user device 102, such as when in possession of user 104, is placed proximate to a particular rendered object, the display is zoomed in on a particular rendered object, gestured to indicate a particular rendered object, or other selection means provided to indicate a particular one depicted secured asset 402, such a secured asset 402 is available for interaction as an augmented reality object as presented on display 302. Additional information 504 may be provided such as a label, identifier, number of associated physical items remaining, alternate configurations, etc. User 104, via user device 102, may then utilize and/or obtain secured information depicted by depicted secure asset 402D, such as, obtaining a media file (e.g., audio, video, document, image, etc.), performing a transaction (e.g., purchasing a physical item depicted by depicted secured asset 402D), gaining access to a secured location depicted by depicted secured asset 402D, etc. In another embodiment, depicted secured asset 402D may be manipulated on user device 102 such as to customize, embellish, select options, etc. for a secured object depicted by depicted secured asset 402D.

Figure 6:
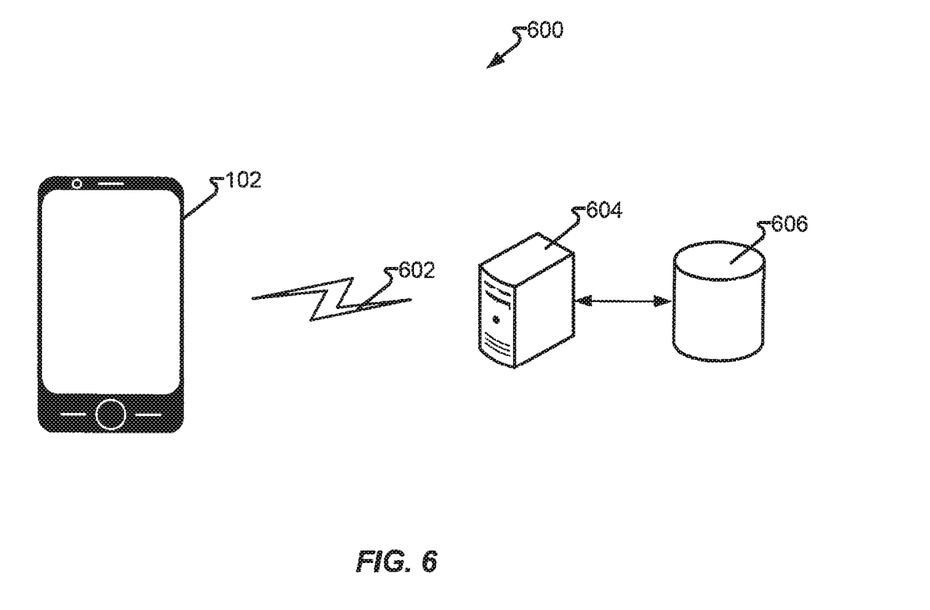
FIG. 6 depicts a system in accordance with embodiments of the present disclosure.

FIG. 6 depicts system 600 in accordance with embodiments of the present disclosure. In one embodiment, user device 102 comprises a wireless network interface to network 602, which may comprise one or more wired or wireless networks or a combination thereof, to be in communication with server 604. Server 604 may comprise one or more processors and access data storage 606, such as a memory location, database, or media (e.g., magnetic, optical, electronic media) to obtain data and/or instructions. For example, server 604 may receive a request for access to a secured asset by user device 102, which optionally has been previously authenticated to user 104. In response, server 604 may access data and/or instructions from data storage 606 in generate and/or provide an authentication challenge, comprising a spatial challenge, to user device 102. User device 102 then provides an output signal to server 604. Upon determining the sensor output signals received by server 604 indicate compliance with the spatial challenge, the processor may then determine the authentication challenge has been successfully completed or access a subsequent challenge, which may comprise a subsequent spatial challenge, to user device 102. If a subsequent challenge is presented to user device 102, which comprises a subsequent spatial challenge, a subsequent signal is received from a sensor output of user device 102. Upon determining the subsequent sensor output signal indicates compliance with the subsequent spatial challenge, determining the authentication challenge has been successfully completed and granting user 104 and/or user device 102 access to the secured asset. It should be appreciated that the authentication challenge comprises one or more spatial challenges and may optionally comprise one or more non-spatial challenge (e.g., provide a user name and password).

In another embodiment, server 604 may provide instructions to user device 102 to provide objects to be rendered upon an augmented reality portion of an image displayed on a display of user device 102. The rendered objects may illustrate cues on how to successfully complete the spatial challenge and/or indicia of secured assets upon completing the authentication challenge.

In another embodiment, server 604 and/or user derive 102 may communicate with other systems and devices, such as user devices of other users, network interfaces, etc. as either a component of a spatial challenge or to allow user 104 and/or user device 102 to obtain the secured asset.

Figure 7:
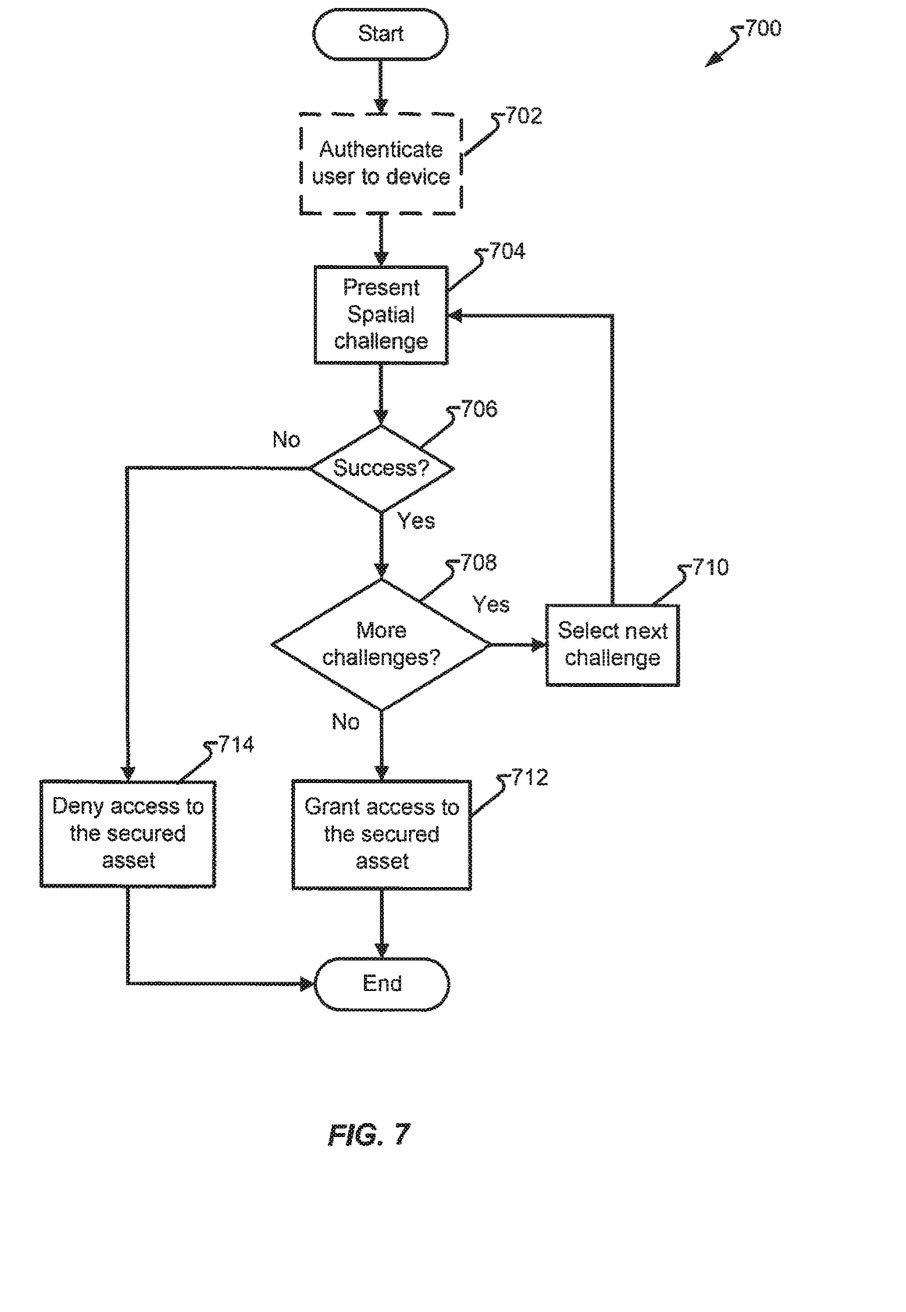
FIG. 7 depicts a process in accordance with embodiments of the present disclosure.

FIG. 7 depicts process 700 in accordance with embodiments of the present disclosure. In one embodiment, optional step 702 authenticates a user to a user device, such as user 104 to user device 102, which may comprise user 104 entering a password, code, and/or presenting a body portion of user 104 to a sensor (e.g., camera) of user device 102 for imaging and biometric recognition, or speaking for capture by a sensor (e.g., microphone) to perform speech-based identification of user 102.

Step 704 presents a spatial challenge upon user device 102. Alternatively, the presentation of the spatial challenge may be provided by audio output or via another component. Accordingly, the presentation may be visual, as presented on a display of user device 102; audio, as presented by a speaker of user device 102, haptic, as presented by a vibrator of user device 102, etc. Next, step 706 determines whether the spatial challenge has been successfully completed. In one embodiment, a sensor of user device 102 outputs signals to a processor, which may be a processor of user device 102 and/or a server 604 in communication with user device 102. The output signals are compared to a model signal known to indicate compliance. The model signal may be an average of a plurality of observed successful completions or other signal associated with an ideal completion of the spatial challenge. If the output signals match the model signal, or differ in a previously determined acceptable type and/or amount, step 706 is determined in the affirmative, otherwise step 706 is determined in the negative.

Step 708 determines if there are more challenges and, if determined in the affirmative, step 710 selects the next challenge. Process 700 then continues to step 704 utilizing the selected next challenge. If step 708 is determined in the negative, process 700 may continue to step 712 whereby access to the secured asset is provided. Should step 706 be determined in the negative, step 714 may deny access to the secured asset. Alternatively, step 706 may allow process 700 to be restarted with the same and/or different spatial challenge or challenges.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A user device, comprising:
   a data storage device; and
   a processor that:
   selects, from the data storage device, an authentication challenge comprising a first spatial challenge, wherein the first spatial challenge comprises an action to be performed at least one of a specific physical location or a specific physical orientation;
   causes the first spatial challenge to be presented by the user device;
   receives a first sensor output indicating a first spatial action of the user device and wherein the first spatial challenge further comprises a validity period and the received first sensor output, in order to be considered in compliance with the first spatial challenge, must be received within the validity period;
   determines whether the authentication challenge is successful, further comprising determining the first sensor output indicates compliance with the first spatial challenge; and
   upon the determination that the authentication challenge is successful, grants the user device access to a secured asset; and
   wherein, at a time outside of the validity period, the first spatial challenge is displayed on the user device as a first augmented reality object indicating that no virtual interaction with the first augmented reality object is possible that would be determined as compliant with the first spatial challenge.

2. The user device of claim 1, wherein the processor:
   upon determining the first sensor output indicates compliance with the first spatial challenge, selects a second spatial challenge from the data storage device, wherein the second spatial challenge comprises an action to be performed at least one of a specific physical location or a specific physical orientation;
   causes the second spatial challenge to be presented by the user device;
   receive a second sensor output indicating a second spatial action of the user device; and
   determines whether the authentication challenge is successful, further comprising determining whether the second sensor output indicates compliance with the second spatial challenge.

3. The user device of claim 1, wherein the first spatial challenge comprises one of capturing an image with a camera of the user device, capturing a sound with a microphone of the user device, placing the user device in a particular orientation, placing the user device in a particular compass heading, placing the user device at a particular vertical location, placing the user device at a particular location, moving the user device through a particular location, moving the user device through a particular compass heading, moving the user device through a particular orientation, moving the user device through a particular vertical location, or proximity to a particular location.

4. The user device of claim 1, wherein the secured asset comprises at least one of a private electronic document, a private media file, or a private item for purchase.

5. The user device of claim 1, wherein the first spatial challenge is displayed on the user device as a second augmented reality object requiring a virtual interaction with the second augmented reality object and the virtual interaction, when successfully, produces the first sensor output.

6. The user device of claim 5, wherein the second augmented reality object comprises a door and wherein compliance with the first spatial challenge comprises transitioning the user device through a particular location co-located with a displayed location of the door.

7. The user device of claim 1, further comprising:
   a network interface to a network; and
   wherein the processor selects, from the data storage device, the authentication challenge further comprising signaling a server via the network interface with a request to be authenticated;
   wherein the processor provides the first sensor output to the server; and
   wherein the processor grants the user device access to the secured asset upon receiving indicia of compliance with the first spatial challenge from the server.

8. The user device of claim 7, wherein the indicia of compliance comprises the secured asset.

9. A server, comprising:
   a data storage device;
   a network interface to a network; and
   a processor that:
   establishes a communication with a first user device, utilizing the network interface, wherein the communication comprises a request for authentication;
   accesses, from the data storage device, an authentication challenge comprising a first spatial challenge, wherein the first spatial challenge comprises an action to be performed at least one of a first specific physical location or a first specific physical orientation;
   sends the first spatial challenge to the first user device for presentation by the first user device;
   receives a first sensor output indicating a first spatial action of the first user device and wherein the first spatial challenge further comprises a validity period and the received first sensor output, in order to be considered in compliance with the first spatial challenge, must be received within the validity period;
   determines whether the authentication challenge is successful, further comprising determining the first sensor output indicates compliance with the first spatial challenge; and upon the determination that the authentication challenge is successful, grants the first user device access to a secured asset; and wherein, at a time outside of the validity period, the first spatial challenge is displayed on the first user device as an augmented reality object indicating that no virtual interaction with the augmented reality object is possible that would be determined as compliant with the first spatial challenge.

10. The server of claim 9, wherein the request for authentication comprises a request to access the secured asset.

11. The server of claim 9, wherein the request for authentication comprises a prior request for access to the secured asset at a time-limited location.

12. The server of claim 9, wherein the processor:
upon determining the first sensor output indicates compliance with the first spatial challenge:
accesses, from the data storage device, a second spatial challenge as a portion of the authentication challenge, wherein the second spatial challenge comprises an action to be performed at least one of a second specific physical location or a second specific physical orientation;
sends the second spatial challenge to the first user device for presentation by the first user device;
receives a second sensor output indicating a second spatial action of the first user device;
determines whether the authentication challenge is successful, further comprising determining the second sensor output indicates compliance with the second spatial challenge.

13. The server of claim 9, wherein the processor:
upon determining the first sensor output indicates compliance with the first spatial challenge:
accesses, from the data storage device, a second spatial challenge as a portion of the authentication challenge;
sends the second spatial challenge to a second user device for presentation by the second user device;
receives a second sensor output indicating a first spatial action of the second user device;
determines whether the authentication challenge is successful, further comprising determining the second sensor output indicates compliance with the second spatial challenge.

14. The server of claim 13, wherein the processor, upon determining the authentication challenge is successful, grants the second user device access to the secured asset.

15. The server of claim 9, wherein accessing the authentication challenge further comprises generating the authentication challenge for storage in the data storage device for access by the processor.

16. A method for authentication, comprising:
selecting an authentication challenge comprising a first spatial challenge, wherein the first spatial challenge comprises an action to be performed at least one of a first specific physical location or a first specific physical orientation;
causes the first spatial challenge to be presented by a user device;
receiving a first sensor output indicating a first spatial action of the user device and wherein the first spatial challenge further comprises a validity period and the received first sensor output, in order to be considered in compliance with the first spatial challenge, must be received within the validity period;
determining whether the authentication challenge is successful, further comprising determining the first sensor output indicates compliance with the first spatial challenge; and
upon the determination that the authentication challenge is successful, granting the user device access to a secured asset; and
wherein, at a time outside of the validity period, the first spatial challenge is displayed on the user device as an augmented reality object indicating that no virtual interaction with the augmented reality object is possible that would be determined as compliant with the first spatial challenge.

17. The method of claim 16, wherein the determining that the first sensor output indicates compliance with the first spatial challenge, comprises comparing the first sensor output with an ideal sensor output and determining that the first sensor output differs from the ideal sensor output by no more than a previously determined acceptable deviation.

18. The method of claim 16, wherein, upon determining the first sensor output indicates compliance with the first spatial challenge:
selecting, as a portion of the authentication challenge, a second spatial challenge, wherein the second spatial challenge comprises an action to be performed at least one of a second specific physical location or a second specific physical orientation;
causes the second spatial challenge to be presented by the user device;
receiving a second sensor output indicating a second spatial action of the user device; and
determining whether the authentication challenge is successful, further comprising determining the second sensor output indicates compliance with the second spatial challenge.

* * * * *